United States Patent [19]

Papastavros

[11] Patent Number: 4,926,644
[45] Date of Patent: May 22, 1990

[54] POWER PLANT WITH MEDIUM AND LOW POWER PLANT SYSTEMS

[76] Inventor: Demos Papastavros, 2429 NE. 184 Ter., North Miami Beach, Fla. 33160

[21] Appl. No.: 422,250

[22] Filed: Oct. 16, 1989

Related U.S. Application Data

[63] Continuation-in-part of Ser. No. 150,636, Feb. 1, 1988, Pat. No. 4,894,984.

[51] Int. Cl.$^5$ ...................... F01K 19/02; F01K 21/00
[52] U.S. Cl. ........................................ 60/715; 60/685; 60/670
[58] Field of Search ................ 60/643, 645, 670, 685, 60/715

[56] References Cited

U.S. PATENT DOCUMENTS 4,240,260 12/1980 Gustafson .......................... 60/670
4,479,354 10/1984 Cosby .................................. 60/670

*Primary Examiner*—Allen M. Ostrager

[57] ABSTRACT

This invention consists of a medium power plant system and a low power plant system with individual closed loops. The medium power plant system recaptures heat energy from any source of heat fluid pressure. The exhaust heat energy of the medium power plant system, through a heat exchange relationship, is used to drive the individual closed loops of the low power plant system. The exhaust heat energy of the low power plant system with individual closed loops, through a heat exchange relationship, is recycled and used to preheat the working fluid inside the closed loop prior to obtaining additional exhaust heat energy from the medium power plant system. The medium power plant system and the low power plant system with individual closed loops contains a plurality of N turbine housing, where N is a whole number greater than one. Each turbine housing contains a power turbine and a compressor turbine. A gear housing, for each of the turbine housings, contains a series of gears and shafts that are designed to allow the compressor turbine to rotate faster and in an opposite direction than the power turbine, even though they are both located and operate in the same turbine housing. The low power plant system with individual closed loops has a plurality of N individual closed loops. Each closed loop consisting of a turbine housing, a condenser and an additional compressor turbine. Each closed loop is in a heat exchange relationship with the medium power power plant system.

13 Claims, 1 Drawing Sheet

_4,926,644_

POWER PLANT WITH MEDIUM AND LOW POWER PLANT SYSTEMS

This aforementioned co-pending application is a continuation-in-part of my co-pending application, Ser. No. 07/150,636 filed Feb. 1, 1988, now U.S. Pat. No. 4,894,984.

SUMMARY OF THE INVENTION

This invention recaptures heat energy and produces mechanical energy from any source of heat fluid pressure (heat energy).

A principal objective of this invention is to provide a novel energy producing system which contains a medium power plant system, which can operate from the heat energy of any source of heat fluid pressure. The medium power plant system uses a series of housing turbines, each of which containing a power turbine and a compressor turbine with both turbines operating in the same housing. Each power turbine in the series is mounted on a common shaft.

Another principal objective of this invention is to provide a novel energy producing system in which each of the compressor turbines are operatively connected to a gear housing system which is designed to allow the compressor turbine to rotate faster and in an opposite direction than the power turbine located in the same turbine housing. Also, the rotor of the compressor turbine has more rotor blades than the rotor of the power turbine.

A further principal objective of this invention is to provide a novel energy producing system that contains a low power plant system with individual closed loops which operates from the exhaust heat energy of each of the compressor turbines of the medium power plant system which is absorbed through a heat exchange relationship at each of the compressor turbine outlets.

Another principal objective of this invention is to provide a novel energy producing system in which the low power plant system contains a series of individual closed loops. Each closed loop containing a turbine housing which is similar to those of the medium power plant system in design and function.

A further objective of this invention is to provide a novel energy producing system in which each of the turbine housings of the medium power plant system and low power plant system are designed to have a fluid conduit which passes outside the rotor blades of the power turbine, "tapering in", decreasing in size from the turbine housing inlet to the power turbine inlet and a fluid conduit, "tapering out", increasing in size as the fluid conduit passes outside the rotor blades of the compressor turbine outlet to the turbine housing outlet. Each of the power turbines are designed to allow the working fluid to hit all the rotor blades equally, continuously and with the same pressure.

Further objectives and advantages of the power plant system will be apparent from the following detailed description of a presently prefered embodiment, which is shown schematically in the accompanying drawings.

Before explaining the enclosed embodiment of the present invention in detail it is to be understood that the invention is not limited in its application to the details of the particular arrangement shown since the invention is capable of other embodiments. Also, the terminology used herein is for the purpose of description and not limitation.

DETAILED DESCRIPTION

Figure 1:
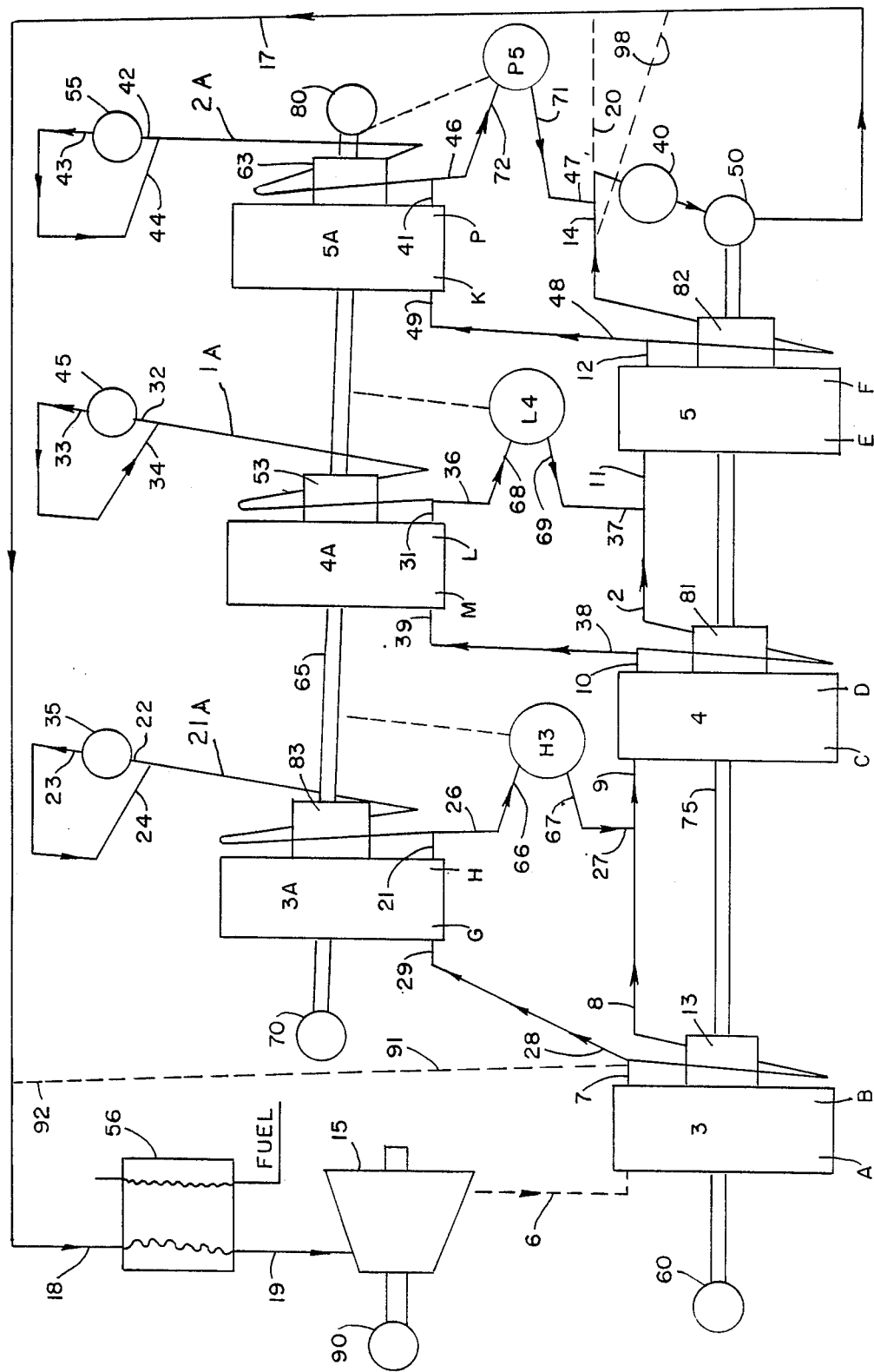
FIG. 1 shows schematically the power plant system having a medium power plant system and a low power plant system with individual closed loops.

FIG. 1 represents a power plant having a medium power plant system and a low power plant system with individual closed loops.

Each of the turbine housings used in both the medium and the low power plant systems contains a power turbine and a compressor turbine enclosed and operating in the same turbine housing. Each of the turbine housings have a gear housing containing different sized gears which allow the compressor turbine to rotate faster and in an opposite direction than the power turbine. The rotor of the compressor turbine has more rotor blades than the rotor of the power turbine.

Each of the power turbines have a fluid conduit which "tapers in" (decreasing in size) as it reaches the power turbine inlet and is designed to allow the working fluid to hit all the rotor blades of the power turbine equally, continuously, and with the same pressure. Each of the compressor turbines have a fluid conduit which "tapers out" (increasing in size) as it reaches the compressor turbine outlet.

The medium power plant system may consist of a plurality of N turbine housings ( where N is a whole number greater than one) each turbine housing having a power turbine and a compressor turbine both operating in the same housing. The medium power plant system can operate from the heat fluid pressure (heat energy) from any source.

Referring to FIG. 1, the medium power plant system consists of turbine housings 3, 4, and 5 (inside which is contained power turbines A, C, and E and compressor turbines B, D, and F), gear housings 13, 81, and 82, shaft 75, generator 60 and pump 50.

Turbine housing 3 contains power turbine A and compressor turbine B. Turbine housing 4 contains power turbine C and compressor turbine D. Turbine housing 5 contains power turbine E and compressor turbine F. Each of the power turbines of the medium power plant system are mounted on common shaft 75 along with generator 60, and gear housings 13, 81, and 82. Each of the compressor turbines are interconnected by individual shafts and individual gears in the aforementioned gear housings.

Figure 2:
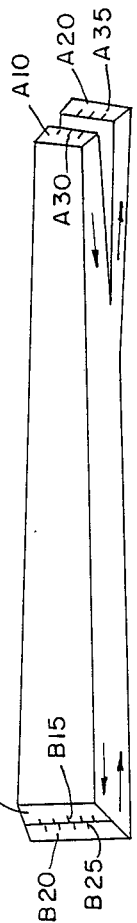
FIG. 2 shows schematically the heat exchange fluid conduits which are involved in the transfer of heat energy in the medium power plant system and the low power plant system with individual closed loops.

FIG. 2 schematically shows a fluid conduit which is designed to allow a heat exchange process to occur between cool condensed fluid and hot exhaust fluid. The fluid conduit is divided into two separate passageways. The two passageways are divided and separated by any material that enhances a heat exchange relationship. The hot exhaust fluid flows through the first passageway of the fluid conduit entering at point B20 and leaving at point A20. The cool condensed fluid flows in the second passageway of the fluid conduit flows in an opposite direction entering at point A10 and leaving at point B10. As the hot exhaust fluid flows from B20 to A20 it gives up heat energy, through a heat exchange relationship, to the cool condensed fluid flowing in the opposite direction from point A10 to point B10, therefore preheating the cool condensed fluid. Numbers B15, B25, A30, and A35 represent fins used to increase the surface area of the material used to facilitate the heat exchange process.

Several of the fluid conduits in the medium power plant system and the low power plant system with individual closed loops are designed like the fluid conduit referred to in FIG. 2. Anytime a reference is made to a first passageway or a second passageway of a particular fluid conduit it should be assumed that the fluid conduit is designed and that it functions in the same manner as the one in FIG. 2.

Point B20 of FIG. 2 refers to fluid conduits 7, 10, and 12 in the medium power plant system of FIG. 1 and fluid conduits 21, 31, and 41 in the low power plant system of FIG. 1. Point A20 of FIG. 2 refers to fluid conduits 9, 11, and 20 in the medium power plant system of FIG. 1 and fluid conduits 22, 32, and 42 in the low power plant system of FIG. 1. Point A10 of FIG. 2 refers to fluid conduits 27, 37, 47, 24, 34, and 44 in the low power plant system of FIG. 1. Point B10 of FIG. 2 refers to fluid conduits 28, 38, 48, 26, 36, and 46 in the low power plant system of FIG. 1.

Referring back to FIG. 1, the medium power plant system can be set up with an open loop cycle or a closed loop cycle. When used as an open loop cycle, the heat energy from the heat fluid pressure from any source flows through conduit 6 to the inlet of power turbine A which is designed to allow the working fluid to hit all the rotor blades of the power turbine equally, continuously and with the same pressure. Compressor turbine B, which operates in the same turbine housing 3 as power turbine A, is designed to rotate faster and in an opposite direction as power turbine A as a result of the gears and shafts located in gear housing 13. The rotor of compressor turbine B has more blades than the rotor of power turbine A. Compressor turbine B absorbs the exhaust fluid from power turbine A and compresses and circulates it to the outlet of of housing turbine 3. The working fluid then flows through fluid conduit 7, through the first passageway of conduit 8 (see FIG. 2), through fluid conduit 9 and then directly into turbine housing 4 and to the inlet of power turbine C. Compressor turbine D absorbs the exhaust fluid of power turbine C and compresses and circulates it to the outlet of turbine housing 4. The working fluid then flows through conduit 10, through the first passageway of conduit 2 (see FIG. 2), through conduit 11 and then directly into turbine housing 5 and to the inlet of power turbine E. Compressor turbine F absorbs the exhaust fluid of power turbine E and circulates it to the outlet of turbine housing 5. The working fluid then flows through conduit 12, through the first passageway of conduit 14 (see FIG. 2) and is released into the environment through conduit 20. This represents a complete open cycle of the medium power plant system.

When used as a closed loop cycle, the fluid flowing through the first passageway of conduit 14 flows to the inlet of condensor 40 instead of being released into the environment. The working fluid flows through condensor 40 to the inlet of pump 50, through pump 50 to conduits 17 and 18 and then directly into the inlet of heater 56, where additional heat energy is added. The working fluid then flows through conduit 19 to the inlet of steam turbine 15. The exhaust heat energy flows from the outlet of steam turbine 15 to fluid conduit 6, to the inlet of turbine housing 3 and then to the inlet of power turbine A. This represents the closed loop cycle of the medium power plant system.

The low power plant system may consist of a plurality of N turbine housings (where N is a whole number greater than one). Each turbine housing contains a power turbine and a compressor turbine both operating within the same turbine housing. The first closed loops of the low power plant system operate from the heat energy recovered from the exhaust fluid of the compressor turbine of the first closed loop of the low power plant system and the heat energy recovered from the exhaust fluid of the first compressor turbine of the medium power plant system, therefore preheating the working fluid which is used to operate the first closed loop of the low power plant system. The other closed loops operate in a similar manner.

Referring to FIG. 1, the low power plant system has a series of interconnected power turbines G, M, and K mounted on common shaft 65 along with generator 70, starter 80, and gear housings 83, 53, and 63. Compressor turbines H, L, and P are interconnected by individual shafts and individual gears in the aforementioned gear housings The low power plant system has a series of closed loops. In the first closed loop, working fluid which has been preheated by heat energy from the medium power plant system enters turbine housing 3A from fluid conduit 29 and then flows directly to the inlet of power turbine G, compressor turbine H (with the help of gear housing 83) absorbs the exhaust fluid from power turbine G and compresses and circulates the working fluid to the outlet of turbine housing 3A. The working fluid then flows through conduit 21, through the first passageway of conduit 21A, through conduit 22 to the inlet of condenser 35 where the working fluid is cooled. The cool condensed working fluid leaves the outlet of condenser 35 and flows through conduit 23, through conduit 24 and enters the second passageway of conduit 21A where it absorbs heat energy from the hot exhaust fluid of compressor turbine H which flows in the opposite direction in the first passageway of fluid conduit 21A, therefore preheating the fluid through a heat exchange process (see FIG. 2). The preheated fluid then flows through fluid conduits 26 and 66 and then directly into the inlet of compressor turbine H3 which is connected to shaft 65. Compressor turbine H3 is similar to the rest of the compressor turbines and can operate with or without a power turbine and with the help of a gear housing (not shown). Compressor turbine H3 compresses and circulates the working fluid to the outlet of the compressor turbine H3. The preheated working fluid then flows through conduits 67 and 27, through the second fluid passageway of conduit 8 where it receives additional heat energy from the hot exhaust fluid from compressor turbine B of the medium power plant system which flows in an opposite direction in the first passageway of conduit 8 (see FIG. 2). The preheated working fluid then flows through conduits 28 and 29 entering the inlet of turbine housing 3A. Therefore hot exhaust fluid from power turbine A provides the heat energy (through a heat exchange relationship) to drive power turbine G. This represents a full cycle of the closed loop cycle of the low power plant system. The other closed loops of the low power plant system operate in a similar manner.

In the second closed loop, working fluid which has been preheated by heat energy from the medium power plant system enters turbine housing 4A from fluid conduit 39 and then flows directly to the inlet of power turbine M, compressor turbine L (with the help of gear housing 53 absorbs the exhaust fluid from power turbine M and compresses and circulates the working fluid to the outlet of turbine housing 4A. The working fluid then flows through conduit 31, through the first passageway of conduit 1A through conduit 32 to the inlet of condenser 45 where the working fluid is cooled. The cool condensed working fluid leaves the outlet of condenser 45 and flows through conduit 33, through conduit 34 and enters the second passageway of conduit 1A where it absorbs heat energy from the hot exhaust fluid of compressor turbine L which flows in the opposite direction in the first passageway of fluid conduit 1A, therefore preheating the fluid through a heat exchange process (see FIG. 2). The preheated fluid then flows through fluid conduits 36 and 68 and then directly into the inlet of compressor turbine L4 which is connected to shaft 65. Compressor turbine L4 is similar to the rest of the compressor turbines and can operate with or without a power turbine and with the help of a gear housing (not shown). Compressor turbine L4 compresses and circulates the working fluid to the outlet of the compressor turbine L4. The preheated working fluid then flows through conduits 69 and 37, through the second fluid passageway of conduit 2 where it receives additional heat energy from the hot exhaust fluid from compressor turbine D of the medium power plant system which flows in an opposite direction in the first passageway of conduit 2 (see FIG. 2). The preheated working fluid then flows through conduits 38 and 39 entering the inlet of turbine housing 4A. Therefore the hot exhaust fluid from power turbine C provides the heat energy (through a heat exchange relationship) to drive power turbine M. This reprsents a full cycle of the closed loop cycle of the low power plant system.

In the third closed loop, working fluid which has been preheated by heat energy from the medium power plant system enters turbine housing 5A from fluid conduit 49 and then flows directly to the inlet of power turbine K, compressor turbine P (with the help of gear housing 63 absorbs the exhaust fluid from power turbine K and compresses and circulates the working fluid to the outlet of turbine housing 5A. The working fluid then flows through conduit 41, through the first passageway of conduit 2A, through conduit 42 to the inlet of condenser 55 where the working fluid is cooled. The cool condensed working fluid leaves the outlet of condenser 55 and flows through conduit 43, through conduit 44 and enters the second passageway of conduit 2A where it absorbs heat energy from the hot exhaust fluid of compressor turbine P which flows in the opposite direction in the first passageway of fluid conduit 2A, therefore preheating the fluid through a heat exchange process (see FIG. 2). The preheated fluid then flows through fluid conduits 46 and 72 and then directly into the inlet of compressor turbine P5 which is connected to shaft 65. Compressor turbine P5 is similar to the rest of the compressor turbines and can operate with or without a power turbine and with the help of a gear housing (not shown). Compressor turbine P5 compresses and circulates the working fluid to the outlet of the compressor turbine P5. The preheated working fluid then flows through conduits 71 and 47 through the second fluid passageway of conduit 14 where it receives additional heat energy from the hot exhaust fluid from compressor turbine F of the medium power plant system which flows in an opposite direction in the first passageway of conduit 14 (see FIG. 2). The preheated working fluid then flows through conduits 48 and 49 entering the inlet of turbine housing 5A. Therefore the hot exhaust fluid from power turbine E provides the heat energy (through a heat exchange relationship) to drive power turbine K. This represents a full cycle of the closed loop cycle of the low power plant system.

Referring to FIG. 1, the open loop of the medium power plant system can be modified so that the working fluid flowing through conduit 14 could be redirected to condenser 40 instead of conduit 20 and the environment. The working fluid would then flow through condenser 40, pump 50, conduit 98 and then through the second passageway arrangements of heat exchange fluid conduits 14, 2 and 8. The working fluid would then flow through conduits 92 and 18 to heater 56. This would allow the working fluid in conduit 14 to receive exhaust heat energy from each of the outlets of turbine housings 5, 4 and 3, therefore preheating the fluid before it reaches heater 56. This would be another way to recapture exhaust heat energy and make the power plant system more efficient.

I claim:
1. In a power plant system having a medium power plant system and a low power plant system with individual closed loops in which each of the medium power plant systems and the low power plant system with individual closed loops containing:
   a plurality of N turbine housings, where N is a whole number greater than one, each having a fluid inlet and a fluid outlet, each of said turbine housings containing a power turbine having a fluid inlet and a fluid outlet and being operatively connected to a first shaft which connects all said power turbines, each of said turbine housings also containing a compressor turbine having a fluid inlet and a fluid outlet and being operatively connected to a second shaft said second shaft is operatively connected to a gear housing system and is designed to allow said compressor turbine to rotate independently of said power turbine, therefore said power turbine and said compressor turbine are located and operate inside each of said plurality of N turbine housings, each of said plurality of N turbine housings having a first fluid conduit means operatively connecting said inlet of said turbine housing to said inlet of said power turbine, said first fluid conduit is designed to pass outside the rotor blades of said power turbine, tapering in, decreasing in size from said inlet of said turbine housing to said inlet of said power turbine,
   each of said plurality of N turbine housings having a means for allowing working fluid to flow from said outlet of said power turbine to the inlet of said compressor turbine,
   each of said plurality of N turbine housings having a second fluid conduit means operatively connecting said outlet of said compressor turbine to said outlet of said turbine housing, said second fluid conduit is designed to pass outside the rotor blades of said compressor turbine, tapering out, increasing in size, from said outlet of said compressor turbine to said outlet of said turbine housing, each of said plurality of N turbine housings having a said gear housing system which consists of a series of individual gears and shafts which are designed to allow said compressor turbine to rotate faster and in an opposite direction from said power turbine, said medium power plant system comprising the combination of:

said plurality of N turbine housings of the medium power plant system, each having a fluid inlet and a fluid outlet;

a generator means operatively connected to said first shaft of the medium power plant system which connects all of the plurality of N power turbines of the medium power plant system;

a plurality of N heat exchange fluid conduits, where N is a whole number greater than one, each of which having a first fluid passageway which contains hot exhaust fluid and a second fluid passageway which contains cold condensed fluid which flows in an opposite direction than the hot exhaust fluid in said first fluid passageway, a fluid conduit means operatively connecting the following in an open loop cycle, an external source of exhaust heat fluid pressure (heat energy) to the inlet of the first of said plurality of N turbine housings of the medium power plant system, said fluid conduit then operatively connecting the outlet of each of said plurality of N turbine housings of the medium power plant system to said first passageway of one of said plurality of N heat exchange fluid conduits and then to the inlet of the next of said plurality of N turbine housings of the medium power plant system, said fluid conduit then operatively connecting the outlet of the last of said plurality of N turbines of the medium power plant system to the environment;

said low power plant system with individual closed loops consisting of a plurality of N individual closed loops, where N is a whole number greater than one, each of said plurality of N individual closedloops comprising a combination of;

said turbine housing of the low power plant system with individual closed loops, having a fluid inlet and a fluid outlet;

a condenser having a fluid inlet, a fluid outlet and condensing means between its inlet and its outlet;

a second compressor turbine having a fluid inlet, a fluid outlet and a compressing and circulating means between its inlet and its outlet, a heat exchange fluid conduit having a first fluid passageway which contains hot exhaust fluid from the outlet of said turbine housing and a second fluid passageway which contains cold condensed fluid from the outlet of said condenser, said cold condenser fluid flowing in an opposite direction than said hot exhaust fluid in said first passageway which is designed to give up heat energy to said second fluid passageway therefore preheating the working fluid;

a fluid conduit means operatively connecting the following in a closed loop cycle, the outlet of said turbine housing to the inlet of the first passageway of said heat exchange fluid conduit, the outlet of the first passageway of said heat exchange fluid conduit, to the inlet of said condenser, the outlet of said condenser to the inlet of the second fluid passageway of said heat exchange fluid conduit, the outlet of the second fluid passageway of said heat exchange fluid conduit to the inlet of said second compressor turbine, the outlet of said second compressor turbine to the inlet of said second fluid passageway of one of the plurality of N heat exchange fluid conduits of the medium power plant system, where the individual closed loop of the low power plant system absorbs additional heat energy from the first fluid passageway of the plurality of N heat exchange fluid conduits of the medium power plant system;

the outlet of said second fluid passageway of one of the plurality of N heat exchange fluid conduits of the medium power plant system to the inlet of said turbine housing representing a complete individual closed loop cycle of the low power plant system;

said low power plant system with individual closed loops also consisting of:

a generator means operatively connected to said first shaft of the low power plant system which connects all of the plurality of N power turbines of the low power plant system:

a starter means operatively connected to said first shaft of the low power plant system.

2. A power plant system according to claim 1 in which heat fluid pressure, heat energy, from any heat source is used to drive said medium power plant system and both of the exhaust heat energies of said medium power plant system and said low power plant system with individual closed loops are used to drive said low power plant system with individual closed loops.

3. A power plant system according to claim 2 in which each of said compressor turbines located inside said turbine housings of both said medium power plant system and said low power plant system are designed to allow a heat exchange process between said outlet of each of said compressor turbines and said outlet of each of said turbine housings.

4. A power plant system according to claim 3 in which each of said power turbines are designed to allow the working fluid to hit all the rotor blades of said power turbines equally, continuously and with the same pressure.

5. A power plant system according to claim 4 and further comprising a means for allowing the gaseous working fluid to have a greater pressure at said inlets of each of said power turbines than at said inlet of said compressor turbines, both said power turbine and compressor turbine operating in the same turbine housing.

6. A power plant system according to claim 5 in which said gear housings are designed to allow said compressor turbines to rotate faster and in an opposite direction than said power turbines eventhough both turbines operate in the same housing.

7. A power plant system according to claim 6 in which the rotor of each of said compressor turbines has more rotor blades than the rotor of each of said power turbines.

8. A power plant system according to claim 7 in which each of said individual closed loops of the low power plant system can operate with a working fluid that is either a fluid or a gas with a constant pressure.

9. A power plant system according to claim 8 in which each of said power turbines of said medium power plant system receives power from a heat exchange relationship where heat losses take place from the exhaust heat fluid pressure which passes through the compressor turbines outlet of the said medium power plant system.

10. A power plant system according to claim 9 in which the power turbines of said low power plant system with individual closed loops receive heat energy to operate from the exhaust heat fluid pressure from the compressor turbines of the medium power plant system.

11. A power plant system according to claim 10 in which the function of each of said compressor turbines and each of said second compressor turbines of the low power plant system with individual closed loops is to compress and circulate the working fluid through the cycles.

12. A power plant system according to claim 11 in which each of said compressor turbines is mounted on an individual second shaft, said second shaft, having a hollow core inside of which said first shaft is located, this along with said gear housing allows said second shaft to rotate independently around said first shaft which operatively connects said power turbines.

13. A power plant system according to claim 12 and further comprising a means to convert the open loop cycle of the medium power plant system to a closed loop cycle, therefore instead of releasing the heat fluid pressure of the last of the plurality of N turbine housings of the medium power plant system to the environment it would be recycled and redirected to the first of the plurality of N turbine housings of the medium power plant system where additional heat fluid pressure is added from an external source.

* * * * *